Oct. 27, 1970 TATUO KANEMAKI ET AL 3,536,831

APPARATUS FOR DETECTING VARIATIONS IN A FOREGROUND SUBJECT FROM A TELEVISION IMAGE THEREOF

Filed Sept. 26, 1968

Tatuo Kanemaki
Akihiko Kasahara
*INVENTORS*

BY George B. Oujevolk
Attorney 3,536,831

APPARATUS FOR DETECTING VARIATIONS IN A FOREGROUND SUBJECT FROM A TELEVISION IMAGE THEREOF

Tatuo Kanemaki, Soka-shi, Saitama-ken, and Akihiko Kasahara, Yokohama-shi, Japan, assignors to Kabushiki Kaisha Totsu, Tokyo, Japan, a corporation of Japan Filed Sept. 26, 1968, Ser. No. 762,699
Claims priority, application Japan, Apr. 10, 1968, 43/23,914
Int. Cl. H04n 7/02
U.S. Cl. 178—7.5 6 Claims

ABSTRACT OF THE DISCLOSURE

An apparatus for detecting variations in a foreground subject from a television image thereof wherein two or more video inspectors provided with a photo-electric conversion means are attached by suction to the face plate of a television image pickup device, electrical outputs from the video inspectors are supplied to a comparison amplifier, variations in the image are detected by comparison at any desired position of the face plate, and, in case the image does change in accordance with variations in the foreground subject, an alarm means or a control device is automatically actuated.

BACKGROUND OF THE INVENTION

The present invention relates to an apparatus used in watching for any variations in a foreground subject from a television image thereof and capable of automatically indicating such variations instantly.

Heretofore a television apparatus has been widely utilized in watching for variations in general foreground subjects such as the operating condition of machinery, particularly instruments, or actions or movements of human beings. In this case, however, unless the watcher continuously watched without keeping his eyes off a television image at any moment, it was difficult quickly to notice any variations in a foreground subject. Further, it was next to impossible for one watcher to look at the images of a plurality of television pickup units simultaneously and perfectly. Therefore, where the detection of variations in the television image, namely, a foreground subject was entirely left to a watcher's personal vigilance, such changes were often neglected or overlooked, leading to an occurrence of accidents. There was further inconvenience that when he did notice variations in a foreground subject, the watcher himself had to take some means or other in order to indicate them.

SUMMARY OF THE INVENTION

The object of the present invention is to provide a means capable of reliably detecting from a television image changes in the movement, shape, color, brightness or other aspects of a foreground subject, all of which appear on the face plate in the form of varied luminosity, without missing any of such occurrences.

Another object of the invention is automatically to indicate by a warning device the results of detecting the aforesaid changes in the foreground subject.

Still another obejct of the invention is to enable a single watcher unfailingly to watch and detect any changes in the images of a plurality of television pickup devices at the same time.

The present invention mainly consists in attaching by suction two or more video inspectors provided with a photo electric conversion means of the face plate of a television image pickup device, supplying electrical outputs from the video inspectors to a comparison amplifier, detecting by comparison changes in the image at any desired position of the face plate and, in case the image changes in accordance with variations in the foreground subject, automatically actuating a warning or control means.

DETAILED DESCRIPTION OF THE INVENTION

Figure 1:
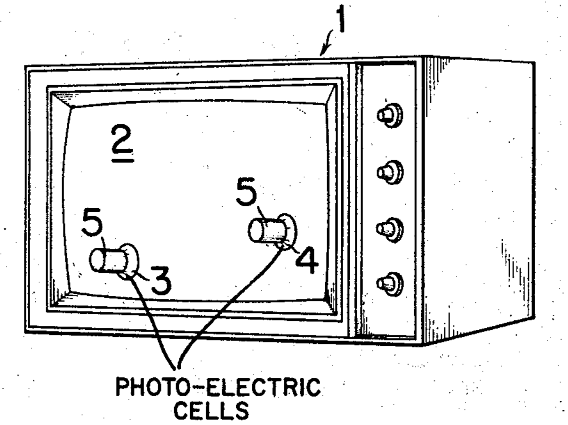
FIG. 1 is a perspective view of an embodiment of the present invention.
Figure 2:
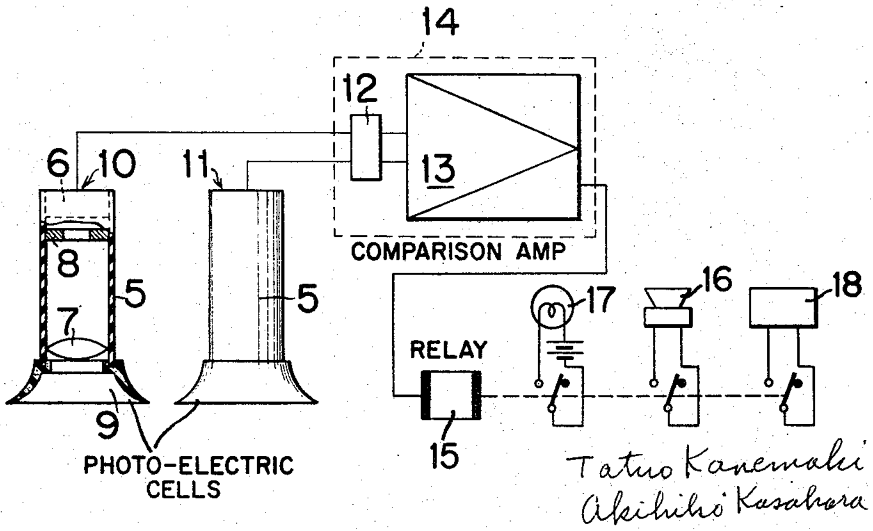
FIG. 2 is an illustration of the main part of said embodiment with a part broken away.

There will now be described an embodiment of the present invention by reference to the appended drawing. Referring to FIG. 1, there are selected, for example, two suitably spaced points at any desired positions of the face plate 2 of a television image pickup device 1, one of the points being taken as a base point 3 and the other as an inspection point 4. The video inspector is prepared as shown in FIG. 2. Namely, there is disposed at one end of a hollow cylindrical member 5 a photo-electric conversion element 6 consisting of cadmium sulfide CdS, a photo-electric transistor or the like, and at the other end is positioned a lens 7. And to concentrate the light collected by the lens 7 on the photo-electric conversion element 6, there is provided a mask 8 between the photo-electric conversion element 6 and the lens 7. Further outside of the lens is provided a sucking means 9 made of rubber or the like for sucking the hollow cylindrical body 5 to the face plate of the television image pickup device. The two video inspectors 10 and 11 of the aforementioned arrangement are connected to a comparison amplifier 14 consisting of a bridge circuit 12 and differential amplifier 13. The output terminal of the comparison amplifier 14 is connected to a relay 15 whose switching operation controls a warning device comprising an alarm means 16 and a pilot lamp 17. In addition to the warning device, the relay 15 may drive the other control apparatus 18 comprising either a control device or a power source switch of machinery and equipment to be watched as a foreground subject for their start, stop or control. Further, the bridge circuit 12 may be replaced by another type, for example, a variable resistor which has an ability to control outputs from the comparison amplifier 14.

There will now be described the operation of the detecting apparatus of the present invention constructed in the aforementioned manner. To begin with, video inspectors 10 and 11 are sucked to the base point 13 and inspection point 14 on the face plate 2 of a television image pickup device. Next, the equilibrium state of the bridge circuit 12 is so adjusted as to set the output of the comparison amplifier 14 at a certain value, for example, zero. When the foreground subject of television makes any movement or presents any change the image on the face plate varies accordingly. The output current from the photo-electric element 6 also alters correspondingly to these variations, and the equilibrium of the bridge circuit is broken to actuate the differential amplifier 13. If in this case, the base point 3 is located at the position on the face plate where the image exhibits very little change, then changes in the image at the inspection point 4 will appear in the form of variations in the substantially absolute amount of output current from the video inspector 11 at said point as compared with the output current at the base point 3, causing an output current to be issued from the comparison amplifier 14. For the purpose of the present invention, it is not always necessary to set the base point 3 at the position where the image presents very little change, because the present apparatus can detect any change in the image either at the base point 3 or at the inspection point 4. As mentioned above, the outputs from the comparison amplifier 14 may operate the relay 15 thereby causing the switching operation of the alarm means 16, the pilot lamp 17, and the other control apparatus 18. Accordingly, when the image changes a warning device such as an alarm means or pilot lamp is automatically actuated, enabling the watcher quickly to detect any change or movement in a foreground subject.

Since the comparison amplifier 14 is so designed as to comapare outputs at the base point 3 and inspection point 4, the detection device of the present invention can not pick up amounts of variation affecting outputs from the base point 3 and inspection point 4 is common, for example, changes in the degree of illumination on a foreground subject, the sensitivity and amplification of a television set or variations in the luminosity of a television pickup tube. Namely, the apparatus of the invention can only detect changes in a foreground subject which will result in different images at the base point 3 and inspection point 4.

Now it will be understood that the base and inspection points used in the present invention are not limited to two positions. It will also be apparent that the larger the number of inspection points, the more parts of a foreground subject can be checked for their variations.

As mentioned above, the apparatus of the present invention can immediately detect variations in a foreground subject, never missing any of them. Moreover, the invention makes it unnecessary for the watcher continuously to watch the image on the face plate, and has the advantageous effect of automatically indicating changes in the foreground subject and controlling the operation thereof, for example, that of machinery and equipment. Consequently, the watcher is only required to look at the image when the warning device is actuated, so that it is possible for him to handle the images of a plurality of television pickup devices at the same time.

Further, the present invention can be used not only in the television image, but also in automatically investigating from phenomena directly or indirectly accompanied with variations in the quantity of light the motion of a foreground subject giving rise to such variations by determining the resultant quantity of light.

What is claimed is:

1. An apparatus for detecting variations in a foreground subject from a television image thereof comprising a television image pickup device projecting the image of a foreground subject to be watched on the face plate thereof, a plurality of light inspectors attached to the face and issuing different output currents in accordance with variations in the image, a comparison amplifier comparing outputs from said light inspectors, and only in the case of such variations, producing different amplified output currents and an alarm device indicating variations in a foreground subject in the form of the corresponding different output currents from the comparison amplifier.

2. An apparatus for detecting variations in a foreground subject according to claim 1 wherein the light inspector comprises a sucking means attached to one end thereof for sucking said inspector to the face plate of a television pickup device, and a photo-electric conversion element producing an output current corresponding to variations in the image.

3. An apparatus for detecting variations in a foreground subject according to claim 1 wherein the comparison amplifier is supplied with outputs from the light inspection, and comprises a bridge circuit for adjusting outputs from said comparison amplifier, and a differential amplifier connected to the bridge circuit and actuated in accordance with the differentials between the outputs from the light inspectors.

4. An apparatus for detecting variations in a foreground subject according to claim 1 wherein the warning device comprises an alarm means and, pilot lamp, and a relay for operating them.

5. An apparatus for detecting variations in a foreground subject accoding to claim 1 wherein the warning device is replaceable by the power source switch of the foreground subject.

6. The apparatus for detecting variations in a foreground subject according to claim 1 further comprising either a control device or a power source switch of the foreground subject which are interlocked with said warning device.

References Cited

UNITED STATES PATENTS

| | | | |
|---|---|---|---|
| 2,994,077 | 7/1961 | Terhune | 340—258 |
| 3,401,331 | 9/1968 | Mussulman. | |
| 3,488,436 | 1/1970 | Burney | 340—276 |

RICHARD MURRAY, Primary Examiner

R. P. LANGE, Assistant Examiner

U.S. Cl. X.R.

178—6; 340—258